United States Patent
Ishibashi et al.

(10) Patent No.: US 10,749,556 B2
(45) Date of Patent: Aug. 18, 2020

(54) ANTENNA APPARATUS AND WIRELESS APPARATUS

(71) Applicant: SONY CORPORATION, Tokyo (JP)

(72) Inventors: Hiromichi Ishibashi, Tokyo (JP); Nobuyuki Mori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/348,857

(22) PCT Filed: Nov. 8, 2017

(86) PCT No.: PCT/JP2017/040280
§ 371 (c)(1),
(2) Date: May 9, 2019

(87) PCT Pub. No.: WO2018/123283
PCT Pub. Date: Jul. 5, 2018

(65) Prior Publication Data
US 2019/0319655 A1    Oct. 17, 2019

(30) Foreign Application Priority Data

Dec. 27, 2016    (JP) ................................ 2016-252233

(51) Int. Cl.
*H04B 1/10* (2006.01)
*H01Q 3/24* (2006.01)
(Continued)

(52) U.S. Cl.
CPC ............ *H04B 1/1081* (2013.01); *H01Q 1/38* (2013.01); *H01Q 3/247* (2013.01); *H04N 5/60* (2013.01); *H01Q 1/2291* (2013.01)

(58) Field of Classification Search
CPC ........ H04B 1/1081; H01Q 1/38; H01Q 3/247; H01Q 1/2291; H04N 5/60
(Continued)

(56) References Cited

U.S. PATENT DOCUMENTS

| | | | |
|---|---|---|---|
| 2006/0038734 A1* | 2/2006 | Shtrom | ..................... H01Q 1/38 343/795 |
| 2006/0038738 A1 | 2/2006 | Shtrom | |
| 2006/0116094 A1* | 6/2006 | Suzu | ..................... H01Q 25/002 455/154.1 |

FOREIGN PATENT DOCUMENTS

| | | |
|---|---|---|
| JP | 05-029994 A | 2/1993 |
| JP | 08-065032 A | 3/1996 |
| JP | 2009-005245 A | 1/2009 |

OTHER PUBLICATIONS

International Search Report and Written Opinion of PCT Application No. PCT/JP2017/040280, dated Jan. 30, 2018, 07 pages of ISRWO.

* cited by examiner

*Primary Examiner* — Lee Nguyen
(74) *Attorney, Agent, or Firm* — Chip Law Group

(57) ABSTRACT

An antenna apparatus includes: a plurality of first antenna elements to be connected to a first power-feeding point; and a plurality of second antenna elements to be connected to a second power-feeding point, the plurality of first antenna elements and the plurality of second antenna elements being respectively radially arranged, in which one of the first antenna elements, which is selected, is connected to the first power-feeding point through a first switch apparatus and one of the second antenna elements, which is selected, is connected to the second power-feeding point through a second switch apparatus.

12 Claims, 8 Drawing Sheets

(51) Int. Cl.
    *H01Q 1/38*     (2006.01)
    *H04N 5/60*     (2006.01)
    *H01Q 1/22*     (2006.01)

(58) Field of Classification Search
    USPC .......................................... 455/277.1–277.2
    See application file for complete search history.

FIG. 3A
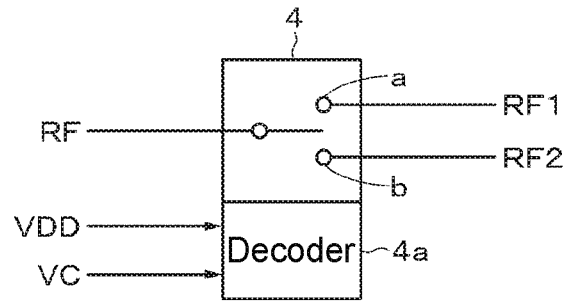
FIG. 3B
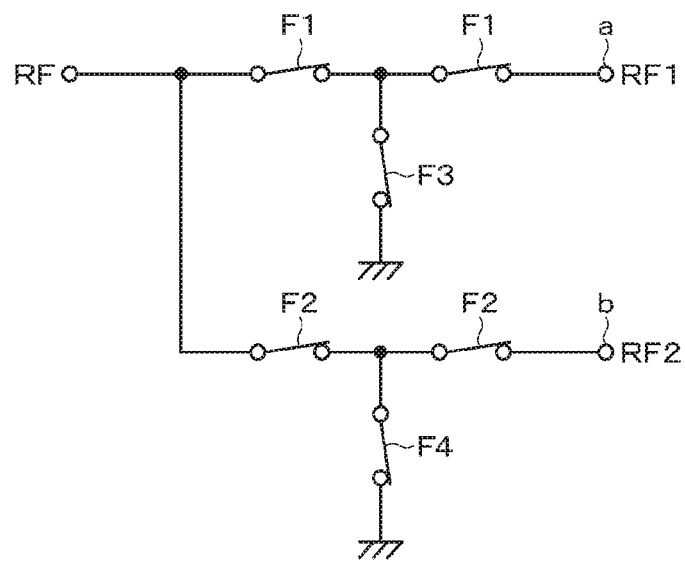
FIG. 3C
| State | Active path | VC state | Switch state | | | |
|---|---|---|---|---|---|---|
| | | | F1 | F2 | F3 | F4 |
| 1 | RF→RF1 | L | ON | OFF | OFF | ON |
| 2 | RF→RF2 | H | OFF | ON | ON | OFF |

ANTENNA APPARATUS AND WIRELESS APPARATUS

CROSS REFERENCE TO RELATED APPLICATIONS

This application is a U.S. National Phase of International Patent Application No. PCT/JP2017/040280 filed on Nov. 8, 2017, which claims priority benefit of Japanese Patent Application No. JP 2016-252233 filed in the Japan Patent Office on Dec. 27, 2016. Each of the above-referenced applications is hereby incorporated herein by reference in its entirety.

TECHNICAL FIELD

The present technology relates to an antenna apparatus and a wireless apparatus to be applied for building a domestic wireless network, for example.

BACKGROUND ART

A system in which a wireless network is built in a house and apparatuses such as a personal computer (PC), a smartphone, a television receiver, and an audio reproduction system can be connected over a wireless network has been recently implemented. There is a "multi-path problem" as a problem in such wireless transmission. In a multi-path environment, a reflected wave is present with respect to a direct arriving wave. Therefore, a phenomenon that a reception level is greatly lowered occurs in such a manner that the phases of the direct arriving wave and the reflected wave are inverted and those waves are received by an antenna, in a manner that depends on a reception position. In a case where a reception terminal is small, the terminal can be set at a best reception position by changing the orientation of the terminal. However, in a case of a large apparatus such as a television receiver and an audio reproduction system, it is difficult to easily change the orientation and further, it is impossible to change the orientation also in view of circumstances associated with a viewing position and a listening position.

A "diversity antenna", a "sector antenna", and the like exist as conventional techniques for such a problem and are generally well known. Those are techniques of arranging a plurality of antennas apart from one another to lower the correlation and selecting an antenna having a highest reception level from among them. In this technique, the plurality of antennas is provided as options for each reception position. Therefore, the multi-path problem is alleviated. However, in those conventional techniques, firstly, a plurality of antennas is necessary and secondly, arrangement of the antennas apart from one another to provide a lower correlation is necessary, and thus there is a problem in that a space required for mounting the antennas becomes larger.

Patent Literature 1 has described a configuration in which a switch 3 performs switching between an antenna apparatus, which is formed by radially arranging film-like coil elements on a printed board, and a transceiver. Each of elements C1 to C8 in the radial form, which are described in Patent Literature 1, is an antenna and varies the directivity by combining outputs of the plurality of antennas each having different angles. The switch 3 is adapted to switch only an output RF signal of the antenna (module element)

CITATION LIST

Patent Literature

Patent Literature 1: Japanese Patent Application Laid-open No. HEI 8-65032

DISCLOSURE OF INVENTION

Technical Problem

Regarding what is described in Patent Literature 1, only a power-feeding port is depicted. However, an antenna necessarily requires a ground area having the same area as a power-feeding area. Therefore, there is a problem in that the antenna size increases. Further, in Patent Literature 1, in order to feed power to a plurality of ports, it is necessary to provide distribution and combination devices the number of which corresponds to the number of power-feeding units. Therefore, there is a problem in that distribution loss is generated at the time of sending and large transmission loss is generated because combination loss is necessarily generated at the time of receiving.

Therefore, it is an object of the present technology to provide an antenna apparatus and a wireless apparatus in which those problems do not arise.

Solution to Problem

The present technology is an antenna apparatus including:
a plurality of first antenna elements to be connected to a first power-feeding point; and
a plurality of second antenna elements to be connected to a second power-feeding point, the plurality of first antenna elements and the plurality of second antenna elements being respectively radially arranged, in which
one of the first antenna elements, which is selected, is connected to the first power-feeding point through a first switch apparatus and one of the second antenna elements, which is selected, is connected to the second power-feeding point through a second switch apparatus.

Further, the present technology is a wireless apparatus that receives a high-frequency signal through an antenna apparatus and outputs an audio signal and/or a video signal, the antenna apparatus including
a plurality of first antenna elements to be connected to a first power-feeding point, and
a plurality of second antenna elements to be connected to a second power-feeding point, the plurality of first antenna elements and the plurality of second antenna elements being respectively radially arranged, in which
one of the first antenna elements, which is selected, is connected to the first power-feeding point through a first switch apparatus and one of the second antenna elements, which is selected, is connected to the second power-feeding point through a second switch apparatus.

In addition, the present technology is an antenna apparatus including:
two first antenna elements to be connected to a first power-feeding point; and
two second antenna elements to be connected to a second power-feeding point, the two first antenna elements and the two second antenna elements being respectively radially arranged, in which
switching is performed from a state in which one of the two first antenna elements, which is selected, is connected to the first power-feeding point through a first switch apparatus, to a state in which the other of the two first antenna elements is connected to one of the power-feeding points through the first switch apparatus and switching is performed from a state in which one of the two second antenna elements, which is selected, is connected to the second power-feeding point through a second switch apparatus to a state in which the other of the two second antenna elements is connected to the other of the power-feeding points through the second switch apparatus.

Advantageous Effects of Invention

In accordance with at least one embodiment, the present technology requires a small space for mounting an antenna and further, is capable of reducing transmission loss. It should be noted that the effect described here is not necessarily limitative and may be any effect described in the present technology or an effect different from these.

BRIEF DESCRIPTION OF DRAWINGS

FIGS. 3A, 3B, and 3C are a block diagram, a connection diagram, and a table for a operation description of an example of a switch apparatus.

MODE(S) FOR CARRYING OUT THE INVENTION

An embodiment described hereinafter is a favorable specific example of the present technology, and various technically favorable limitations are added. However, it should be understood that in the following descriptions, the range of the present technology is not limited to those embodiments unless especially it is indicated that the present technology is limited.

It should be noted that descriptions of the present technology will be made in the order described below.
<1. Embodiment>
<2. Modified example>

1. Embodiment

"Entire Configuration of Wireless Apparatus"

Figure 1:
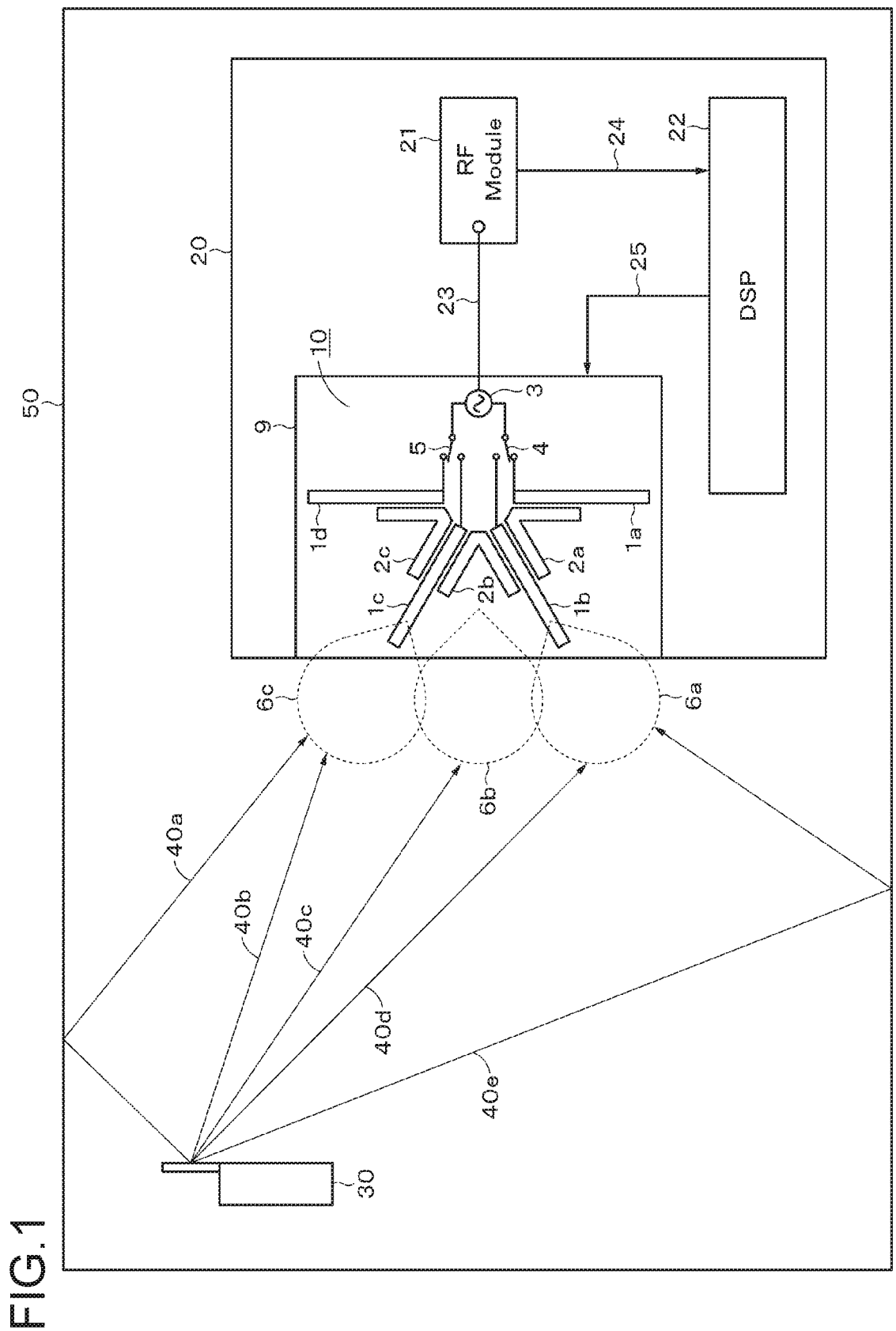
FIG. 1 is a block diagram of an embodiment of a wireless apparatus according to the present technology.

FIG. 1 shows a configuration of an embodiment of the present technology. For example, a wireless local area network (wireless LAN) is built inside a house 50. A wireless apparatus 30 as a master performs wireless communication with a wireless apparatus 20 as a slave. The wireless apparatus 20 includes a wireless LAN-compatible audio reproduction apparatus, a speaker apparatus, a wireless LAN-compatible television apparatus, and the like. The wireless apparatus 20 includes an antenna apparatus 10 having a variable-directivity according to the present technology. The antenna apparatus 10 has radiation directivities 6a, 6b, and 6c.

In a case where wireless communication is performed between the wireless apparatus 20 and the wireless apparatus 30 within the house 50, a wireless transmission signal includes signals 40a and 40e as well as signals 40b, 40c, and 40d. The signals 40b, 40c, and 40d are direct arriving waves. The signals 40a and 40e are reflected waves reflected on a ceiling and a wall. In such a multi-path environment, the reception level greatly fluctuates at the antenna apparatus 10 provided in the wireless apparatus 20.

For example, the wireless transmission signals 40a and 40b are received by the radiation directivity 6c. However, in a case where a transmission distance at which the phases of the wireless transmission signal 40a and the wireless transmission signal 40b are inverted and those signals are received, the reception level is greatly lowered in the antenna radiation directivity 6c. In a wireless apparatus in which only one antenna radiation characteristic can be selected, conventionally, the antenna radiation directivity 6c can be deviated by moving an installation location of the wireless apparatus on a receiver side and the reception condition can be improved. However, with such a method, it is difficult to understand to what degree the wireless apparatus should be moved, the improvement effect is unstable, and in some cases, there is even a possibility that the reception condition may be deteriorated.

At the antenna apparatus 10 of the wireless apparatus 20 according to the present technology, a configuration of a power-feeding point switching antenna is employed. The antenna apparatus 10 is mounted on a printed circuit board 9. As will be described later, the antenna apparatus 10 is an antenna in which the antenna radiation directivity is switched every time the connection of the antenna to a power-feeding point 3 is switched through switches 4 and 5. FIG. 1 shows the antenna radiation directivities 6a, 6b, and 6c.

A plurality of first antenna elements 1a and 1b to be connected to a first power-feeding point (+ side, RF signal side) and a plurality of second antenna elements 1c and 1d to be connected to a second power-feeding point (− side, ground side)) are radially arranged. In addition, non-power-feeding elements 2a, 2b, and 2c are provided. The switch 4 connects the + side of the power-feeding point 3 to one of the antenna elements 1a and 1b. The switch 5 connects the − side of the power-feeding point 3 to one of the antenna elements 1c and 1d.

For example, in a case where the antenna elements 1a and 1d are connected to the power-feeding point 3 by the switches 4 and 5, a dipole antenna in which the two antenna elements 1a and 1d face each other at an angular interval of 180 degrees is configured. In this case, the antenna radiation directivity 6b is obtained. In addition, in a case where the antenna elements 1a and 1c are selected, the antenna radiation directivity 6b is obtained. In a case where the antenna elements 1a and 1c are selected, the antenna radiation directivity 6a is obtained. It is the dipole antenna adapted to select one first element and one second element.

A signal received by any of those antenna radiation directivities is supplied to an RF module 21 as an RF signal processing circuit as an RF signal 23 via a transmission channel formed in the printed circuit board 9. In the RF module 21, the reception level in the antenna apparatus 10 is converted into a numerical value and is supplied to a control apparatus, for example, a digital signal processor (DSP) 22 as the status signal 24. Although not shown in the figure, a signal including information regarding a video signal, an audio signal, a data signal, and the like is output from the RF module 21 and a reproduction apparatus corresponding to each signal is connected to the RF module 21.

In the DSP 22, the reception levels of the plurality of antennas radiation directivities 6a, 6b, and 6c are compared and a control signal 25 for selecting the antenna radiation directivity having a maximum reception level is formed. The control signal 25 is supplied to the antenna apparatus 10 from the DSP 22. In accordance with the control signal 25, the switches 4 and 5 of the antenna apparatus 10 are controlled and the antenna radiation directivity having a maximum reception level is selected.

In controlling the antenna radiation directivity of the antenna apparatus 10 in this manner, the wireless apparatus 20 is capable of automatically selecting an optimal antenna in accordance with a house environment and an environment fluctuation situation in the house and realizing best effort communication.

"Antenna Apparatus"

The antenna apparatus 10 will be described in detail with reference to FIG. 2. The antenna apparatus 10 in the embodiment of the present technology includes the antenna elements 1a, 1b, 1c, and 1d, the non-power-feeding elements 2a, 2b, and 2c, the power-feeding point 3, and the switches 4 and 5. Those components are mounted on the printed circuit board 9. The antenna elements 1a to 1d are radially formed at positions on the printed circuit board 9 to divide a semi-circle at equiangular intervals of 60 degrees. The non-power-feeding elements 2a to 2c are formed in regions divided by the antenna elements adjacent to each other as V-shaped patterns.

The switch 4 connects the + side (side on which the RF signal flows) of the power-feeding point 3 to the power-feeding point of one of the antenna elements 1a and 1b. The switch 5 connects the − side (ground side) of the power-feeding point 3 to the power-feeding point of one of the antenna elements 1c and 1d. The respective lengths of the antenna elements 1a to 1d are set to be equal. The lengths of the antenna elements 1a to 1d are set to receive a signal having a frequency of a 2.4 GHz band of the wireless LAN, for example.

In a case where the power-feeding point 3 is connected to the two antenna elements through the switches 4 and 5, a half-wave length dipole antenna is configured. The total length of the two antenna elements is set to $\lambda/2$ ($\lambda$: one wavelength of a resonant frequency). In a case where the antenna elements 1a and 1d are selected, the antenna radiation directivity 6b is obtained. In a case where the antenna elements 1a and 1c are selected, the antenna radiation directivity 6a is obtained. In a case where the antenna elements 1b and 1d are selected, the antenna radiation directivity 6c is obtained.

An example of the switch 4 for high frequency, which has an IC configuration, is shown in FIG. 3A. An RF signal terminal is connected to one of terminals a and b. A power supply voltage VDD and a control voltage VC are supplied to a decoder 4a provided in the switch 4. The switch is controlled such that the decoder 4a selects one of the terminal a or b in accordance with the control voltage VC.

The switch 4 can be expressed by an equivalent circuit as shown in FIG. 3B. The RF signal terminal is connected to the terminal a (RF1 signal) via two switches F1 and is grounded via a switch F3 between the two switches F1. Further, the RF signal terminal is connected to the terminal b (RF2 signal) via two switches F2 and is grounded via a switch F4 between the two switches F2.

An operation of the switch 4 is as shown in the table of FIG. 3C. In a case where the control voltage VC is L (low level), (F1: ON, F2: OFF, F3: OFF, F4: ON) is established and the active path becomes (RF-RF1) (State 1). In a case where the control voltage VC is H (high level), (F1: OFF, F2: ON, F3: ON, F4: OFF) is established and the active path becomes (RF-RF2) (State 2). A configuration similar to that of the switch 4 can also be used for the switch 5.

Figure 4A:
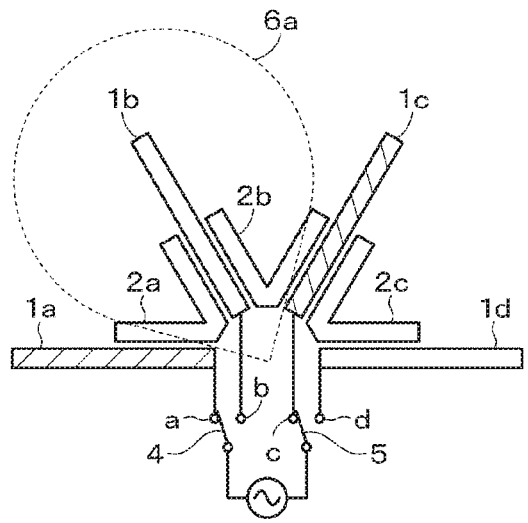
FIGS. 4A, 4B, 4C, and 4D are schematic diagrams to be used for describing switching of an antenna radiation directivity of the embodiment of the antenna apparatus.

The operation and action of the above-mentioned embodiment of the present technology will be described with reference to FIGS. 4A, 4B, 4C, and 4D. The dipole antenna is established by the antenna element in which a high-frequency signal flows and the antenna element which is a ground. As shown in FIG. 4A, in a case where the switch 4 selects the terminal a and the switch 5 selects the terminal c, a dipole antenna having a facing angle of 120 degrees is constituted by the antenna element 1a (shown as oblique lines) and the antenna element 1c (shown as oblique lines). The antenna radiation directivity 6a along the center line of this dipole antenna is obtained.

Figure 4C:
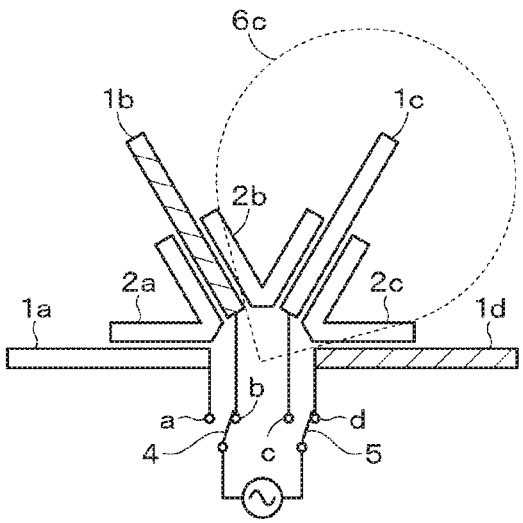
Figure 4B:
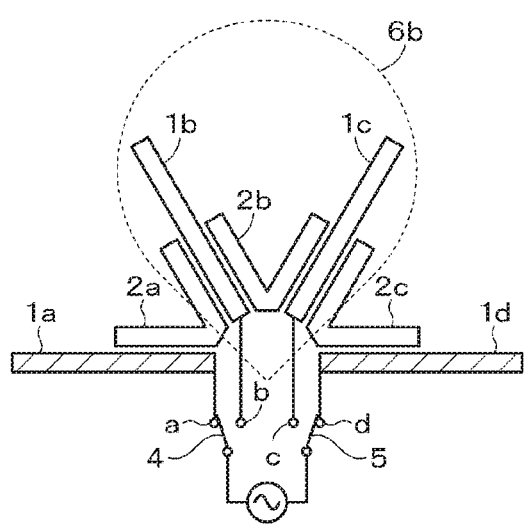

As shown in FIG. 4B, in a case where the switch 4 selects the terminal a and the switch 5 selects the terminal d, a dipole antenna having a facing angle of 180 degrees is constituted by the antenna element 1a (shown as oblique lines) and the antenna element 1d (shown as oblique lines). The antenna radiation directivity 6b along the center line of this dipole antenna is obtained.

Figure 4D:
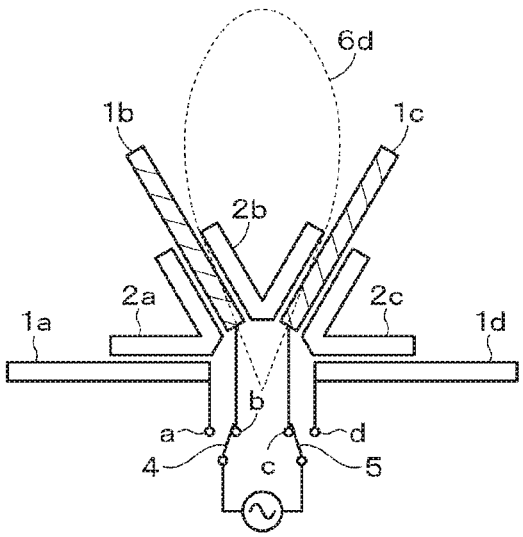

As shown in FIG. 4C, in a case where the switch 4 selects the terminal b and the switch 5 selects the terminal d, a dipole antenna having a facing angle of 120 degrees is constituted by the antenna element 1b (shown as oblique lines) and the antenna element 1d (shown as oblique lines). The antenna radiation directivity 6c along the center line of this dipole antenna is obtained. In addition, as shown in FIG. 4D, the switch 4 may select the terminal b, the switch 5 may select the terminal c, and a dipole antenna having a facing angle of 60 degrees may be constituted by the antenna element 1b (shown as oblique lines) and the antenna element 1c (shown as oblique lines). An antenna radiation directivity 6d in this case has a narrower width while it is further projected forward.

In a case where the antenna elements 1a and 1c are selected (FIG. 4A), the non-power-feeding elements 2a and 2b located therebetween are excited and oscillated by electromagnetic induction at a certain frequency and radiate a high-frequency signal as the antenna. An antenna radiation directivity thereof is in a direction similar to a direction of the antenna radiation directivity 6a. The resonant frequency depends on the respective element lengths of the antenna elements 1a and 1c. By setting the lengths of the non-power-feeding elements 2a and 2b to lengths different from the lengths of the antenna elements 1a and 1c, an antenna compatible for broadband use can be realized. Lengths when the V-shapes of the non-power-feeding elements 2a, 2b, and 2c are opened to facing positions of 180 degrees are the lengths of the non-power-feeding elements 2a, 2b, and 2c. The lengths of the non-power-feeding elements 2a, 2b, and 2c are set to be equal to one another.

In a case where the antenna elements 1a and 1d are similarly selected (FIG. 4B), the non-power-feeding elements 2a, 2b, and 2c located therebetween are excited and oscillated by electromagnetic induction at a certain frequency and radiate a high-frequency signal as the antenna. An antenna radiation directivity thereof is in a direction similar to a direction of the antenna radiation directivity 6b. In a case where the antenna elements 1b and 1d are similarly selected (FIG. 4C), the non-power-feeding elements 2b and 2c located therebetween are excited and oscillated by electromagnetic induction at a certain frequency and radiate a high-frequency signal as the antenna. An antenna radiation directivity thereof is a direction similar to a direction of the antenna radiation directivity 6c. By setting the element lengths of the non-power-feeding elements 2a to 2c to lengths different from the respective element lengths of the antenna elements 1a to 1d, a reception band can be made to be broadband or multi-band.

In the embodiment of the present technology, in order to control the antenna radiation directivity, a control operation performed by the DSP 22 will be described with reference to the flowchart of FIG. 5. For example, receiver strength (in FIG. 5, referred to as receiver signal strength indicator (RSSI)) is used as an indication representing the intensity of received radio waves. Additionally, signal to noise ratio (SNR) may be used as an indication considering the communication quality as being important. Switching of the reception antenna is performed by controlling the switches 4 and 5.

Step ST1: the power supply is activated and the processing starts.

Figure 5:
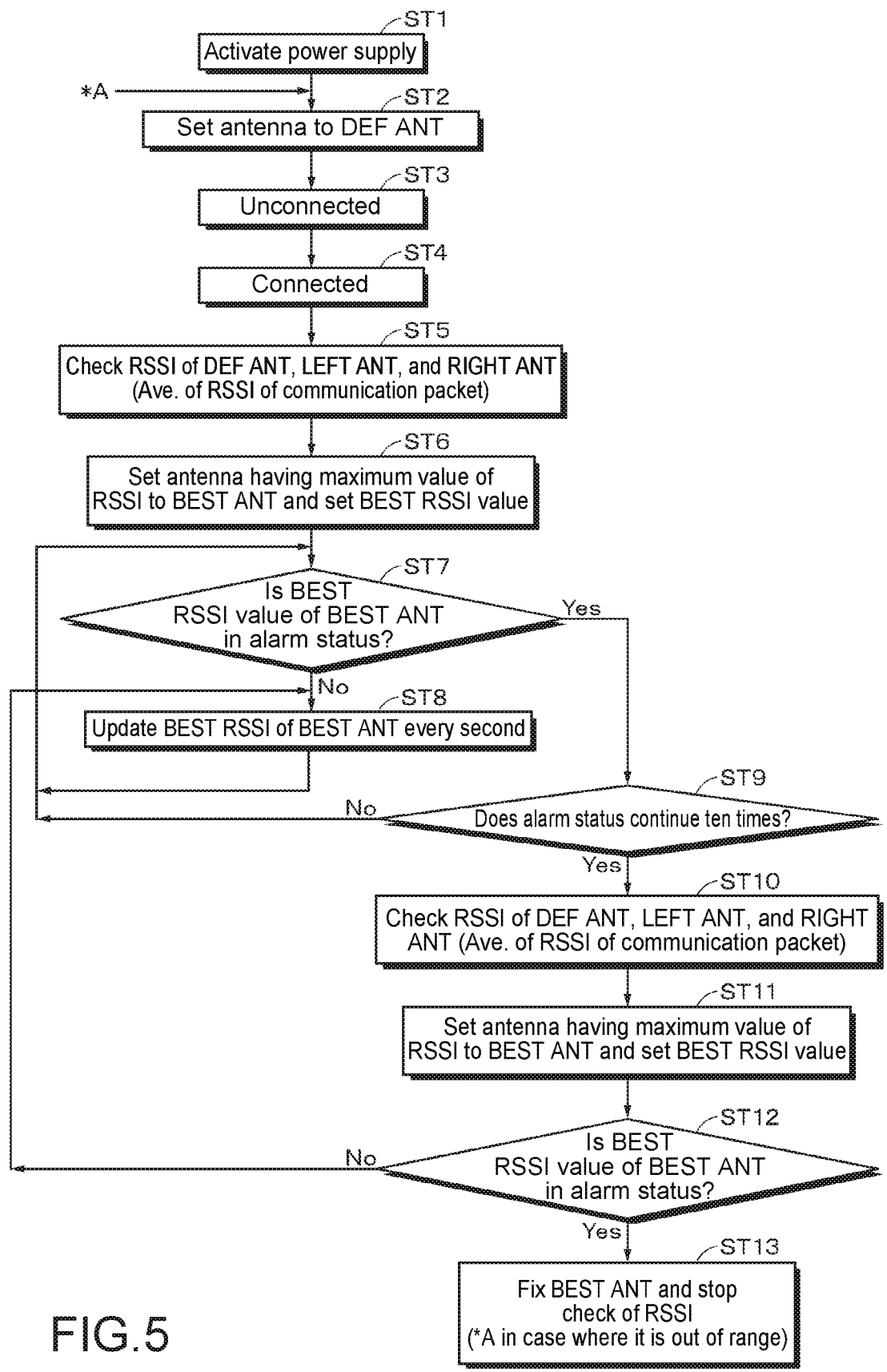
FIG. 5 is a flowchart to be used for an operation description of an embodiment of a wireless apparatus according to the present technology.

Step ST2: the antenna is set to a default antenna (in FIG. 5, referred to as DEF ANT). For example, the antenna elements 1a and 1d in which the antenna radiation directivity 6b is generated are selected. The antenna including the antenna elements 1a and 1c in which the radiation directivity 6a is generated will be referred to as a left antenna (in FIG. 5, referred to as LEFT ANT) and the antenna including the antenna elements 1b and 1d in which the radiation directivity is generated will be referred to as a right antenna (in FIG. 5, referred to as RIGHT ANT).

Step ST3: unconnected

Step ST4: connected

Step ST5: check the receiver strength of each of the default antenna, the left antenna, and the right antenna. For example, a mean value of the receiver strength of the communication packet is checked.

Step ST6: the antenna having a maximum value of the receiver strength checked in Step ST5 is set to the best antenna (in FIG. 5, referred to as BEST ANT) and best receiver strength (in FIG. 5, referred to as BEST RSSI) is set.

Step ST7: whether the best receiver strength is in an alarm status is determined. The alarm status indicates that the receiver strength is so low that a favorable reception result cannot be obtained.

Step ST8: in Step ST7, if it is determined that it is not in the alarm status, the best receiver strength of the best antenna is updated for each predetermined time, for example, every second. Then, the processing returns to Step ST7.

Step ST9: in Step ST7, if it is determined that the best receiver strength is in the alarm status, whether the alarm status continues a plurality of times, for example, ten times is determined. If it is determined that the alarm status does not continue ten times, the processing returns to Step ST7 (determination as to whether the receiver strength is in the alarm status).

Step ST10: in Step ST9, if it is determined that the alarm status continues ten times, the receiver strength of each of the default antenna, the left antenna, and the right antenna is checked. For example, the mean value of the receiver strength of the communication packet is checked.

Step ST11: out of the receiver strength checked in Step ST10, the antenna of the receiver strength of the maximum value is set to the best antenna and the receiver strength thereof is set to the best receiver strength.

Step ST12: whether the best receiver strength set in Step ST11 is in the alarm status is determined. I it is determined that it is not in the alarm status, the processing shifts to Step ST8 (updating the best receiver strength of the best antenna every second).

Step ST13: in Step ST12, if it is determined that it is in the alarm status, the best antenna is fixed and the check of the receiver strength is stopped. If the receiver strength shows out of range, the processing returns to Step ST2 (setting the antenna to the default antenna) as shown as *A and performs antenna setting processing from the beginning.

By the control operation of the DSP 22 as described above, a best antenna exhibiting a best directivity can be automatically set. Therefore, it becomes unnecessary to manually change the orientation of the wireless apparatus 20 according to the embodiment of the present technology.

In a case where the "multi-path problem" is solved by antenna switching in accordance with the above-mentioned present technology, it is unnecessary to provide an installation antenna of a plurality of antennas as in the conventional one and the antenna itself is deformed and radiates. Therefore, an antenna capable of switching the radiation directivity in a saved space can be provided. Further, the V-shaped non-power-feeding elements compatible for the power-feeding point switching method are arranged between the antenna elements, and thus a plurality of frequencies can be switched at a similar radiation directivity angle.

2. Modified Example

Figure 6A:
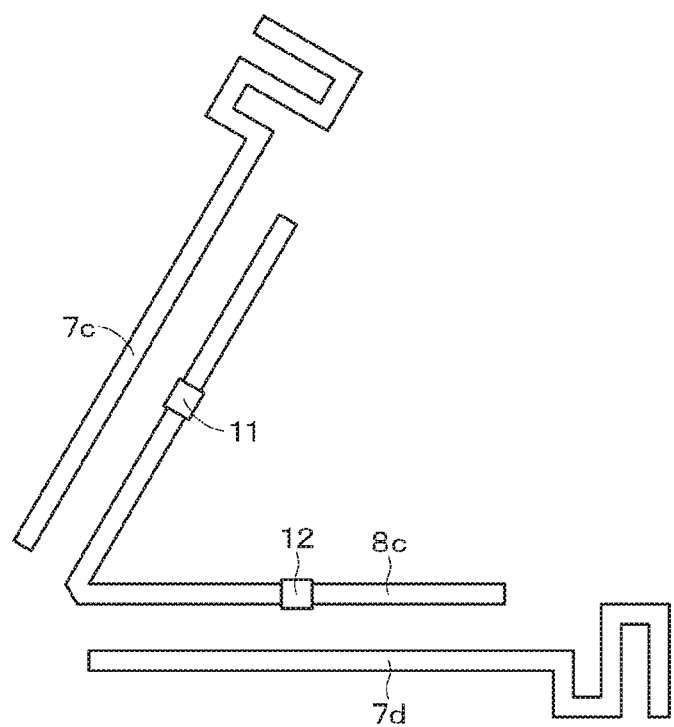
FIGS. 6A and 6B are schematic diagrams to be used for describing a modified example of the antenna apparatus according to the present technology.

A modified example of a variable-directivity antenna according to the present technology will be described. A method of reducing the size of the antenna will be described with reference to FIGS. 6A and 6B. As shown in FIG. 6A, the element lengths can be shortened by forming the antenna elements 7c and 7d corresponding to the antenna elements 1c and 1d in a meander shape. The same applies to the antenna elements 1a and 1b (not shown). The element lengths may be shortened by forming the non-power-feeding elements in a meander shape.

Further, regarding a non-power-feeding element 8c corresponding to the non-power-feeding element 2c, the element length is shortened in such a manner that chip inductors 11 and 12 are provided at middle positions of the portions obtained by bending the element. The same applies to the non-power-feeding elements 2a and 2b (not shown). The chip inductors may be provided in the antenna elements and the element length may be shortened.

Figure 6B:
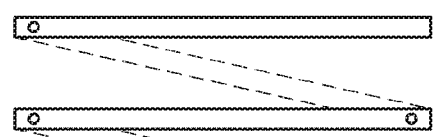
Figure 6B:
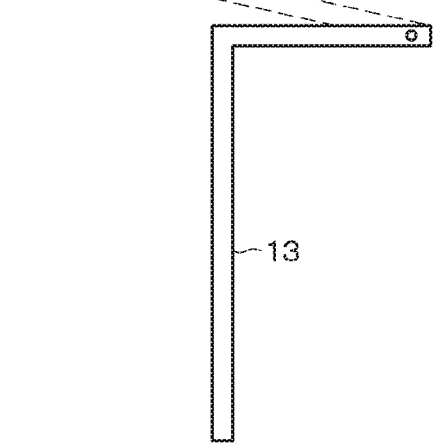

As shown in FIG. 6B, in a case where an antenna element 13 corresponding to any of the antenna elements 1a to 1d is formed on the printed circuit board, it is formed in a spiral shape and electrically conductive patterns are alternately formed on one surface of the board and the other surface of the board. The element length can be shortened by forming the patterns on the both surfaces. The same applies to the non-power-feeding element.

Figure 2:
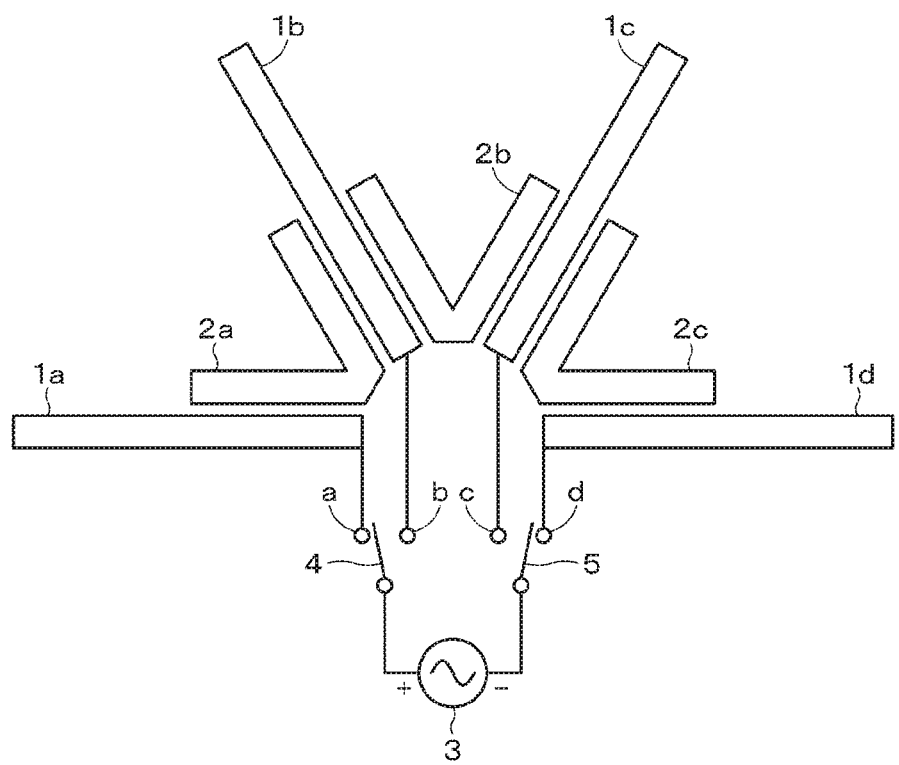
FIG. 2 is a schematic diagram of an embodiment of an antenna apparatus according to the present technology.
Figure 7:
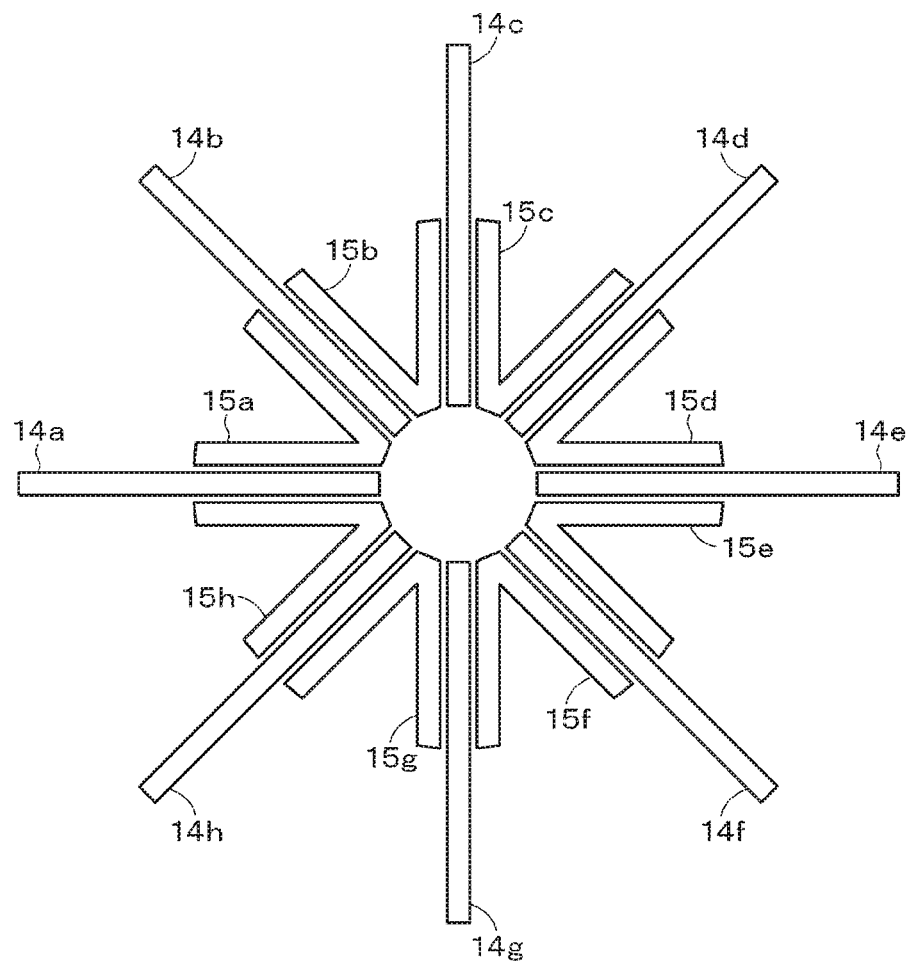
FIG. 7 is a schematic diagram to be used for describing a modified example of the antenna apparatus according to the present technology.

Although the antenna elements 1a to 1d are formed to divide the semi-circle in the antenna apparatus 10 shown in FIG. 2, antenna elements 14a to 14h may be formed to divide a circle as shown in of FIG. 7. That is, the antenna elements 14a to 14h are radially formed at positions to divide the circle at equiangular intervals of 45 degrees. The non-power-feeding elements 15a to 15h are formed as V-shaped patterns in regions partitioned by the antenna elements adjacent to each other. An antenna apparatus shown in FIG. 7 is capable of switching in a range of 360 degrees. Further, the antenna apparatus shown in FIG. 7 is capable of switching the antenna radiation directivity with high precision by arranging it at a narrower angle (45 degrees).

Figure 8:
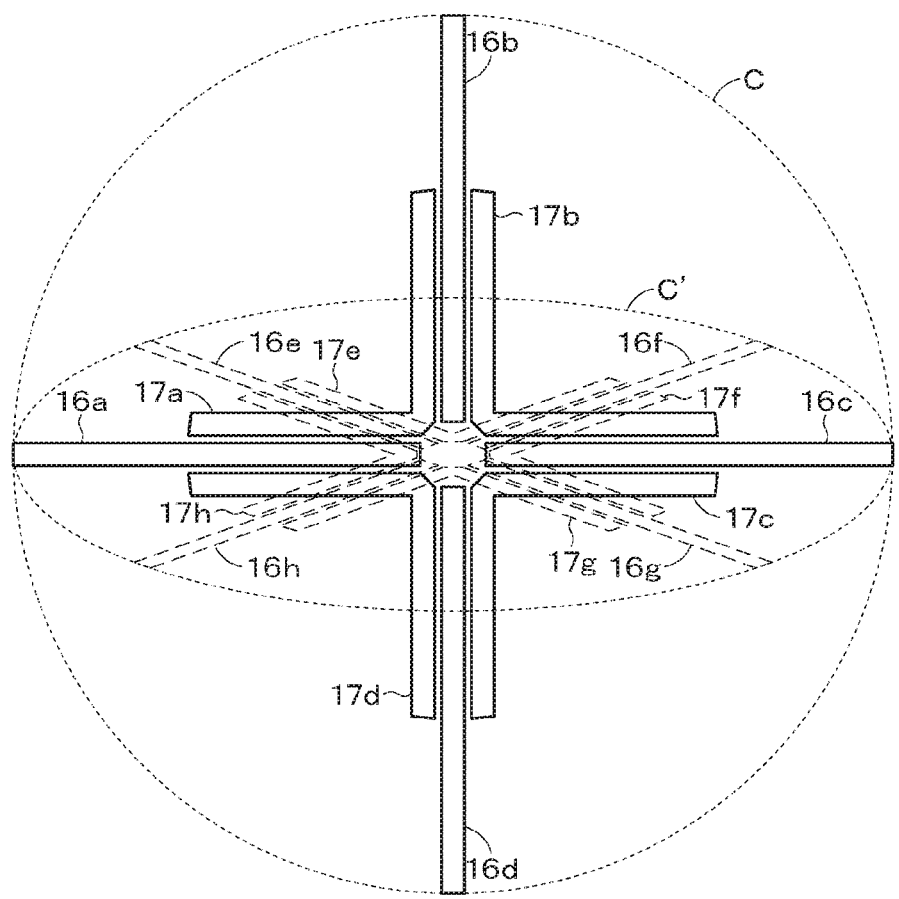
FIG. 8 is a schematic diagram to be used for describing a modified example of the antenna apparatus according to the present technology.

As shown in of FIG. 8, in a sphere formed stereoscopically, for example, by rotating a circle C shown as the broken line around a diameter once, antenna elements 16a, 16b, 16c, and 16d are arranged at positions to divide the circle C at angular intervals of 90 degrees and antenna elements 16e, 16f, 16g, and 16h are arranged at positions to divide a circle C' at a position when the circle C is rotated about the diameter at 90 degrees, at angular intervals of 90 degrees. An antenna apparatus shown in FIG. 8 is capable of not only switching at an angle on the plane but also switching of a stereoscopic angle like an angle of elevation.

Although the embodiment of the present technology has been specifically described hereinabove, the present technology is not limited to the embodiment and various modifications can be made based on the technical ideas of the present technology. The configurations, methods, processes, shapes, materials, and numerical values, etc. shown in the above-mentioned embodiments are merely examples and other configurations, methods, processes, shapes, materials, and numerical values, etc. may be used depending on needs.

It should be noted that the present technology can also take configurations as follows.

(1) An antenna apparatus, including:
a plurality of first antenna elements to be connected to a first power-feeding point; and
a plurality of second antenna elements to be connected to a second power-feeding point, the plurality of first antenna elements and the plurality of second antenna elements being respectively radially arranged, in which
one of the first antenna elements, which is selected, is connected to the first power-feeding point through a first switch apparatus and one of the second antenna elements, which is selected, is connected to the second power-feeding point through a second switch apparatus.

(2) The antenna apparatus according to (1), in which
the first antenna elements and the second antenna elements are set to have a substantially equal length.

(3) The antenna apparatus according to (1) or (2), in which
non-power-feeding elements are respectively arranged close to the radially arranged first antenna elements or second antenna elements.

(4) The antenna apparatus according to (3), in which
the first antenna elements, the second antenna elements, and the non-power-feeding elements are formed as a pattern of an electric conductor on a printed circuit board.

(5) The antenna apparatus according to any of (1) to (4), in which
the first antenna element and the second antenna element are set to have a substantially equal length and the non-power-feeding elements are set to have a length different from the length of the first and second antenna elements.

(6) A wireless apparatus that receives a high-frequency signal through an antenna apparatus and outputs an audio signal and/or a video signal, the antenna apparatus including
a plurality of first antenna elements to be connected to a first power-feeding point, and
a plurality of second antenna elements to be connected to a second power-feeding point, the plurality of first antenna elements and the plurality of second antenna elements being respectively radially arranged, in which
one of the first antenna elements, which is selected, is connected to the first power-feeding point through a first switch apparatus and one of the second antenna elements, which is selected, is connected to the second power-feeding point through a second switch apparatus.

(7) An antenna apparatus, including:
two first antenna elements to be connected to a first power-feeding point; and
two second antenna elements to be connected to a second power-feeding point, the two first antenna elements and the two second antenna elements being respectively radially arranged, in which
switching is performed from a state in which one of the two first antenna elements, which is selected, is connected to the first power-feeding point through a first switch apparatus, to a state in which the other of the two first antenna elements is connected to one of the power-feeding points through the first switch apparatus and
switching is performed from a state in which one of the two second antenna elements, which is selected, is connected to the second power-feeding point through a second switch apparatus to a state in which the other of the two second antenna elements is connected to the other of the power-feeding points through the second switch apparatus.

(8) The antenna apparatus according to (7), in which
the switching of the antenna element through the first and second switches is performed in such a manner that directivity of reception is changed.

(9) The antenna apparatus according to (7) or (8), in which
the first antenna elements and the second antenna elements are formed as a pattern of an electric conductor on a printed circuit board.

1a to 1h antenna element
2a to 2h non-power-feeding element
3 power-feeding point
4, 5 switch
6a to 6c antenna radiation directivity

The invention claimed is:

1. An antenna apparatus, comprising:
a plurality of first antenna elements configured to connect to a first power-feeding point;
a plurality of second antenna elements configured to connect to a second power-feeding point, wherein each combination of the plurality of first antenna elements and the plurality of second antenna elements corresponds to a radiation directivity of a plurality of radiation directivities of the antenna apparatus;
a first switch apparatus; and
a second switch apparatus, wherein
the plurality of first antenna elements and the plurality of second antenna elements are radially arranged,
the first switch apparatus is configured to connect one of the plurality of first antenna elements to the first power-feeding point based on a selection of the one of the plurality of first antenna elements,
the second switch apparatus is configured to connect one of the plurality of second antenna elements to the second power-feeding point based on a selection of the one of the plurality of second antenna elements, and
the first switch apparatus and the second switch apparatus are controlled such that the radiation directivity of the antenna apparatus that has a maximum reception level is selected among the plurality of radiation directivities of the antenna apparatus.

2. The antenna apparatus according to claim 1, wherein the plurality of first antenna elements and the plurality of second antenna elements have a substantially equal length.

3. The antenna apparatus according to claim 1, further comprising
a plurality of non-power-feeding elements each adjacent to at least one of the plurality of first antenna elements and the plurality of second antenna elements.

4. The antenna apparatus according to claim 3, wherein the plurality of first antenna elements, the plurality of second antenna elements, and the plurality of non-power-feeding elements are formed as a pattern of an electric conductor on a printed circuit board.

5. The antenna apparatus according to claim 3, wherein the plurality of the first antenna elements and the plurality of second antenna elements have a substantially equal length, and
the plurality of non-power-feeding elements have a length different from the length of the plurality of first antenna elements and the plurality of second antenna elements.

6. The antenna apparatus according to claim 3, wherein each of the plurality of non-power-feeding elements has a V-shape pattern.

7. The antenna apparatus according to claim 1, wherein the selection of the one of the plurality of first antenna elements and the selection of the one of the plurality of second antenna elements are based on a control voltage received by the first switch apparatus and the second switch apparatus.

8. The antenna apparatus according to claim 1, wherein the plurality of first antenna elements and the plurality of second antenna elements comprise chip inductors.

9. A wireless apparatus, comprising:
an antenna apparatus that comprises:
  a plurality of first antenna elements configured to connect to a first power-feeding point;
  a plurality of second antenna elements configured to connect to a second power-feeding point, wherein each combination of the plurality of first antenna elements and the plurality of second antenna elements corresponds to a radiation directivity of a plurality of radiation directivities of the antenna apparatus;
a first switch apparatus; and
a second switch apparatus, wherein
the plurality of first antenna elements and the plurality of second antenna elements are radially arranged,
the first switch apparatus is configured to connect one of the plurality of first antenna elements to the first power-feeding point based on a selection of the one of the plurality of first antenna elements,
the second switch apparatus is configured to connect one of the plurality of second antenna elements to the second power-feeding point based on a selection of the one of the plurality of second antenna elements, and
the first switch apparatus and the second switch apparatus are controlled such that the radiation directivity of the antenna apparatus that has a maximum reception level is selected among the plurality of radiation directivities of the antenna apparatus.

10. An antenna apparatus, comprising:
two first antenna elements configured to connect to a first power-feeding point;
two second antenna elements configured to connect to a second power-feeding point, wherein each combination of the two first antenna elements and the two second antenna elements corresponds to a radiation directivity of a plurality of radiation directivities of the antenna apparatus;
a first switch apparatus; and
a second switch apparatus, wherein
the two first antenna elements and the two second antenna elements are radially arranged,
the first switch apparatus is configured to switch a connection of one of the two first antenna elements with the first power-feeding point to a connection of other of the two first antenna elements with the first power-feeding point,
the second switch apparatus is configured to switch a connection of one of the two second antenna elements with the second power-feeding point to a connection of other of the two second antenna elements with the second power-feeding point, and
the first switch apparatus and the second switch apparatus are controlled such that the radiation directivity of the antenna apparatus that has a maximum reception level is selected among the plurality of radiation directivities of the antenna apparatus.

11. The antenna apparatus according to claim 10, wherein, based on the switch between the two first antenna elements and the switch between the two second antenna elements, a directivity of reception of the antenna apparatus is changed.

12. The antenna apparatus according to claim 11, wherein the two first antenna elements and the two second antenna elements are formed as a pattern of an electric conductor on a printed circuit board.

* * * * *